United States Patent [19]

Kithil

[11] Patent Number: 5,366,241

[45] Date of Patent: Nov. 22, 1994

[54] AUTOMOBILE AIR BAG SYSTEM

[76] Inventor: Philip W. Kithil, 1274 Vallecita Dr., Santa Fe, N. Mex. 87501

[21] Appl. No.: 130,089

[22] Filed: Sep. 30, 1993

[51] Int. Cl.⁵ ............................................ B60R 21/32
[52] U.S. Cl. ................................ 280/735; 280/730 R; 280/736
[58] Field of Search ............... 280/728 A, 729, 730 R, 280/735, 736, 739, 741, 742

[56]  References Cited

U.S. PATENT DOCUMENTS

| | | | |
|---|---|---|---|
| 3,629,816 | 12/1971 | Gillund | 280/735 |
| 3,752,501 | 8/1973 | Daniel et al. | 280/731 |
| 3,774,936 | 11/1973 | Barnett et al. | 280/730 R |
| 3,894,750 | 7/1975 | Eckels | 280/730 R |
| 3,900,210 | 8/1975 | Lohr et al. | 280/729 |
| 3,917,023 | 11/1975 | De Rosa | 280/730 R |
| 4,006,918 | 2/1977 | MacFarland | 280/729 |
| 4,130,298 | 12/1978 | Shaunnessey | 280/730 R |
| 4,346,914 | 8/1982 | Livers et al. | 280/735 |
| 4,360,223 | 11/1982 | Kirchoff | 280/729 |
| 4,536,008 | 8/1985 | Brown, Jr. | 280/730 R |
| 4,565,535 | 1/1986 | Tassy | 280/728 A |
| 4,985,835 | 1/1991 | Sterier et al. | 364/424.05 |
| 5,033,390 | 7/1991 | Minert et al. | 280/742 |
| 5,039,035 | 8/1991 | Fitzpatrick | 280/730 R |
| 5,058,921 | 10/1991 | Cuevas | 280/741 |
| 5,071,160 | 12/1991 | White et al. | 280/735 |
| 5,118,134 | 6/1992 | Mattes | 280/735 |

OTHER PUBLICATIONS

D. S. Breed et al, "A critique of single point sensing", SAE Int'l Report No. 920124, Feb. 1992, p. 51.
PARS Document, Author & Date Unknown.
D. S. Breed et al, "A complete frontal crash sensor system-1", SAE Int'l Report No. 930650, Mar. 1993, pp. 119-121, 124-132.

Primary Examiner—Kenneth R. Rice
Attorney, Agent, or Firm—Robert W. Harris

[57] ABSTRACT

An overhead-mounted air bag deployment system, having overhead sensors and a microprocessor to measure and analyze passenger motion as well as vehicle deceleration, for consideration by the microprocessor in deciding whether to deploy the air bag, so as to deal with case-to-case variations in passenger motion. The system also has both a warning light and a warning sleeve on the steering wheel, to discourage the driver from remaining in a position involving an increased risk of injury, and has an automatic bag release means to release the air bag and free the passenger when the collision is over.

13 Claims, 6 Drawing Sheets

AUTOMOBILE AIR BAG SYSTEM

BACKGROUND OF THE INVENTION

The present invention concerns systems for deployment of air bags during vehicle crashes. More particularly it concerns systems in which the system operation is affected not only by information about the deceleration of the vehicle caused by crash forces, but also measured data concerning the passenger, including height, position and motion of the passenger, so that the system will operate in a manner to minimize the risk of serious injury to the passenger. It is also concerned with means to warn the passenger about the enhanced risk of serious injury which can occur during air bag deployment if the passenger is out of proper position in relation to the air bag system, and means to automatically release the passenger from the air bag restraint and regain passenger visibility when the collision is over.

Automobile air bag systems are a well known means of attempting to reduce the likelihood of serious injury to passengers in collisions. These systems are designed to very quickly inflate an air bag in front of a passenger during a collision, so as to hopefully prevent the passenger from colliding with hard objects in the passenger compartment interior, particularly the steering column and/or the dashboard. As described in documents filed with applicant's Information Disclosure Statement, the system typically senses that the vehicle is involved in a collision, by using an accelerometer to sense sudden deceleration of the vehicle. Rapid inflation of the air bag may be obtained by electrical ignition of a pyrotechnic substance which rapidly generates a volume of gas sufficient to inflate the air bag, or by means of compressed gas stored in a chamber which is part of the air bag system.

The performance of an air bag system, in terms of its success or failure in preventing serious passenger injury, may be critically dependent on facts concerning the initial position and subsequent motion of the passenger, which are not made known to the system by an accelerometer which senses deceleration of the vehicle as a whole. For example, if the passenger is seated too far forward, occupying the space into which the air bag will deploy, the passenger may, ironically, be seriously injured by the deployment of the air bag intended to prevent passenger injury. So there is clearly a need for passenger position sensing apparatus, which can prevent air bag deployment when the passenger is already too far forward when the collision begins.

But even if the passenger is not too far forward at the beginning of the collision, the passenger will tend to move rapidly forward, relative to the vehicle, as the vehicle rapidly decelerates, and will tend to move into the air bag deployment space, at least in the case of forward collisions, and may be too far into the air bag deployment space, before the completion of air bag deployment, to escape injury from the air bag deployment. There are a number of factors which may strongly influence the forward motion of the passenger, in addition to initial position. The relative forward motion of the passenger will depend strongly on whether the passenger has secured a seat lap belt and/or shoulder harness prior to the collision. The passenger's motion may also be influenced somewhat by the strength of any tensing up reaction the passenger has to the collision, i.e. instinctively pushing forward with the feet against the floorboard to restrain forward motion of the body. Such a protective reaction may vary greatly from one passenger to another, and may be greatly reduced or wholly absent if the collision is too sudden, so that the passenger has no time to react, or if the passenger is quite intoxicated. Also variation of the crash intensity by itself will cause considerable variation in passenger acceleration. So there is a need for systems which measure the position vs. time of the passenger, and analyze that information in making the yes or no decision on air bag deployment. Although such systems are known, as described in documents filed with applicant's Information Disclosure Statement, applicant is not aware of such a system employing overhead sensors, as in the present invention. Overhead sensors offer an advantage over those previously known systems having sensors located in front of the passenger, as in air bag systems and sensors mounted on the steering column, for which the sensors will at times by blocked from operating by the hands and/or forearms of the driver. Also such systems may not measure the change of position of most critical body parts, such as the head, but rather less critical portions, such as the torso.

The prospect for successful operation of an air bag system in a particular crash may depend not only on the passenger's initial position, and the motion of the passenger's body as a whole, but may also depend on the height of the passenger, which affects the position and motion of the passenger's head during the collision. The head of the passenger is of course particularly vulnerable to serious and often fatal injury from collision with hard surfaces during a collision. So the present invention includes sensor means to determine the height of the passenger's head, as one important initial position parameter to be considered by the system's microprocessor.

In order to discourage a passenger from riding in a position causing an increased risk of injury, such as a position too far forward, it is desirable to warn the passenger against such unsafe positions. It has been known to have a warning light for this purpose, where a position sensor detects this condition. However, a warning light alone may not be noticed, and the present invention also provides an additional means, for the driver, namely a tactile and printed warning sleeve on the steering wheel.

It is also desirable to have a means for the air bag to be automatically released after the collision is over, so that the bag can deflate and free the passenger to see and be able to bring the vehicle to a stop if it is still in motion, and be able to exit the vehicle and/or render aid to other passengers. This could be particularly important if another passenger is more seriously injured and needs immediate emergency rescue personnel to be called to the accident scene, or if a fire has started as a result of the collision. The present invention meets this need by providing an air bag release means which functions automatically.

Since the design of automotive air bag systems continues to evolve, as more knowledge is gained about the dynamics of crashes, including problems associated with variations in passenger motion during a crash, there is a need, for crash investigation purposes, for a system which can record the vehicle and passenger motion during the crash process. This need is met by the present invention, through the provision of recording means connected to the sensors which detect vehicle and passenger motion.

Depending upon the nature of the collision, there may be a need for an air bag in which the total cushioning time can be stretched out, to a longer time than that which could be obtained with a single chamber air bag. Applicant believes that the present invention may be useful in this respect, through the provision of a multi-chamber air bag, in which the gas flows sequentially between various chambers of the air bag.

SUMMARY OF THE INVENTION

The invention is an overhead-mounted system, including means for deploying an air bag. The system has sensors to sense the position and acceleration of the occupant's head, and to sense deceleration of the vehicle; outputs of the sensors are analyzed by a microprocessor mounted in the roof area with the sensors, above the occupant, possibly but not necessarily in a longitudinally mounted tunnel. A warning light is mounted on the tunnel housing, which is lit by a signal from the microprocessor if the occupant is not in proper position for safe deployment of the air bag. In the event of a crash, based upon comparisons of the accelerations of the occupant vs. the passenger compartment, and of the vehicle vs. the Earth, and the initial position of the occupant, the microprocessor determines whether the accelerations indicate a crash of sufficient severity for deployment of the air bag, and if so determines optimum deployment time. If deployment could not occur in time to protect the occupant, then no deployment occurs. The microprocessor also contains a recording means, for recording the last 10–15 seconds of signals from the sensors just before and during a crash, for possible later use in crash investigation. A firing signal from microprocessor activates firing squibs which fire two pyrotechnic inflators, which employ sodium azide or other inflator formulations, housed in the ends of a bilateral inflator tube transversely mounted to the vehicle ceiling at the front end of the tunnel, forming a T with the tunnel. Combustion of the inflators releases gas, which flows initially through two filter/cooling chambers in the ends of the inflator tube, each such chamber having screening means to capture slag particles, although the filter/cooling chambers and screening means may not be necessary for some inflator compositions, and thence to a downwardly-pointing nozzle at the middle of the inflator tube, with the two filter/cooling chambers being separated by gas diverters, which force the gas down into the nozzle. The multi-chamber air bag, attached to the nozzle by a releasable clamp, breaks out of a breakaway opening in a cover, upon deployment. The gas enters the air bag via an inflation tube. After the gas has exited the nozzle and inflated the air bag, heat generated by the inflator combustion expands a bimetallic element in the releasable clamp, and residual gas pressure, automatically cause release of the air bag from the nozzle, so as to free the occupant from the obstruction of the air bag, and regain his visibility. To prevent injury to the occupant from gripping the top of the steering wheel at the time of deployment of the air bag, or from sitting too close to the steering wheel or otherwise being out of proper position, a tactile and printed warning sleeve is permanently attached to the top of the steering wheel, to warn the occupant against these and other hazards or limitations of the system, to supplement the warning light feature.

The purposes of the present invention include provision of an air bag deployment system having a combination of elements which will accomplish all of the following purposes: (1) Use actual measured data on passenger height, position and motion, in making the decision as to whether or not the air bag should be deployed, and if deployment is desired, when it should occur; (2) provide overhead passenger position sensors, as opposed to sensors mounted on the steering wheel, door or front panel assembly as in some other systems, so as to avoid the problem of sensor blockage by the hands of the driver; (3) warn the passenger, in more than one manner, against being in a position which would risk injury from air bag deployment; (4) provide automatic release of the air bag after the collision, to free and regain visibility for the passenger; (5) deploy the air bag in a rapid, efficient manner; (6) provide means to record passenger motion just before and during a crash event, for crash investigation purposes; (7) attempt to extend cushioning time, by use of a multi-chamber air bag, and by possible sequential ignition of inflators; (8) minimize the expense of retrofitting the system to an existing automobile having no air bag system, by use of overhead-mounted components, as opposed to components mounted forward of the driver, as in the steering column assembly; (9) provide dual air bag inflators, to allow for possible sequential ignition at different times, to prolong the flow of gas into the air bag, thus possibly extending the cushioning time; and (10) to provide a sun visor mounted above the air bag inflation module, which is attached by a rolling hinge and may be deployed by pulling it down.

DESCRIPTION OF THE PREFERRED EMBODIMENT

Referring now to the drawings, in which like reference numbers denote like or corresponding elements, a hollow mounting tunnel 2 is secured to the interior roof of the passenger compartment, parallel to the vehicle axis, and is located above the occupant, i.e. the driver and/or the passenger. Mounted in mounting tunnel 2, is a passenger sensor array 4, which contains one or more sensors for sensing the position and velocity of the driver or other passenger, as further discussed below. Also housed in mounting tunnel 2, is a vehicle accelerometer 6, also further discussed below, for sensing vehicle deceleration as in a crash; a microprocessor 8, connected by wires (not shown) to the outputs of passenger sensor array 4 and vehicle accelerometer 6, for analysis of the output signals of these sensors, as discussed below, and a backup battery 10, for backup electrical power for system operation; and wiring (not shown) connecting the vehicle electrical system to the air bag electrical system. Located on the bottom of the mounting tunnel 2, is a warning light 12, activated by the system to warn the passenger against remaining in a position that is not suitable for proper system performance, as further discussed below.

At the forward end of mounting tunnel 2, and disposed at a right angle to said tunnel, forming a T therewith, is an air bag module 14, which houses a multichamber air bag 16, further described below, which is normally folded up within air bag module 14, supported from below by a cover 18 having a breakaway portion which will open to allow deployment of air bag 16; and an air bag inflation module 20, further described below, having pyrotechnic inflators 22, which generate gas for inflation of air bag 16. A sunvisor (not shown) may also be attached to inflation module 20 by a rolling hinge. Depending on the sizes of the sensors and other components mounted on mounting tunnel 2, it may be possible to mount all of those components in a small sensor housing on the rear surface of inflation module 20.

Figure 1:
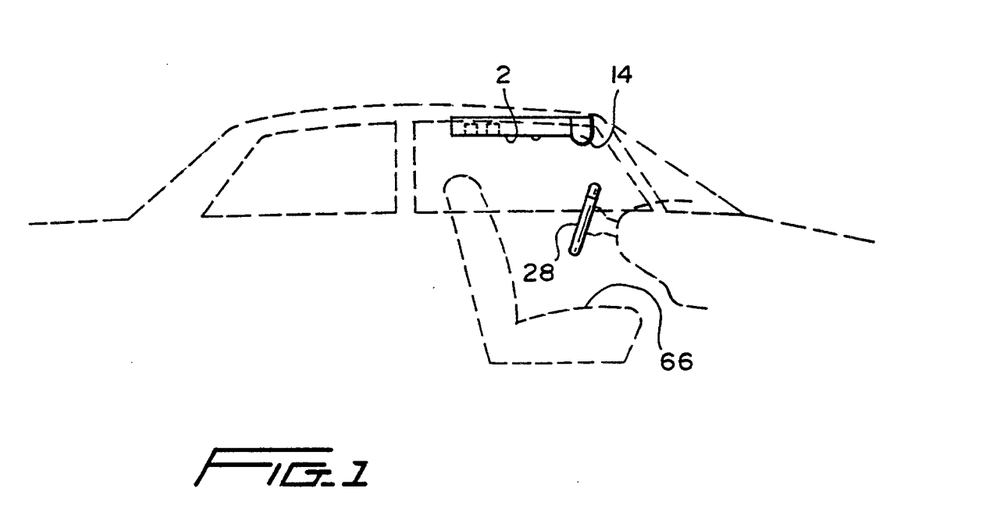
FIG. 1 is a side elevational view of the system.
Figure 2:
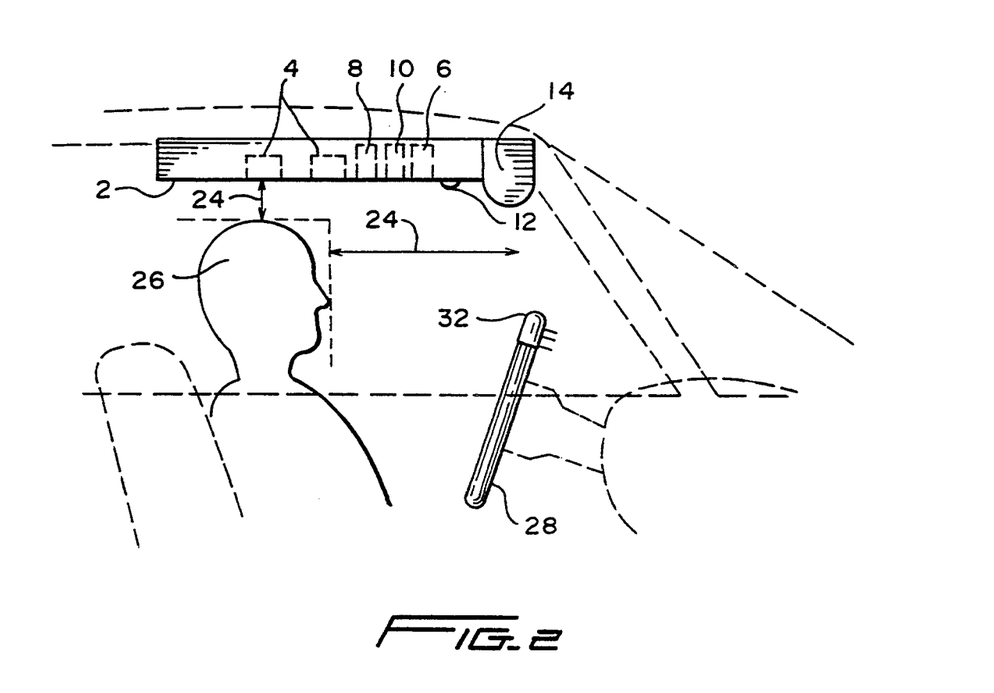
FIG. 2 is view as in FIG. 1, on a somewhat larger scale.

The passenger sensor array 4 contains one or more sensors capable of sensing both position and velocity of the passenger, beginning with the initial passenger position 24, indicated (FIG. 2) by both the longitudinal position of the passenger's head, and the height of the passenger, as indicated by the distance from the top of the passenger's head 26 to the passenger sensor array 4. Because the passenger's head 26 acts like an upside-down pendulum in a crash, even if the passenger is unrestrained, the passenger's head 26 will be the first part of the passenger's body to experience violent forward motion relative to the passenger sensor array 4. The motion of passenger's head 26 thus gives the earliest indication of impending passenger contact with hard interior surfaces of the vehicle. The passenger's torso also moves, but due to greater mass and muscle tone, and presence of the arms on the steering wheel 28, and possible seat belt usage, the torso follows rather than precedes the passenger's head 26. Thus head motion is the more reliable early indicator for passenger motion, for analysis of conditions for deployment of the air bag to protect both the head and torso. The passenger sensor array 4 may contain optical, ultrasonic, infrared and/or microwave emission and absorption devices, as disclosed for example in the air bag deployment system shown in the patent on the invention of Mattes, U.S. Pat. No. 5,118,134, at Col. 3, line 50–Col. 4, line 38, and FIG. 2, which disclosure is incorporated herein by this reference, capable of measuring both position and velocity of the passenger, possibly employing more than one type of physical process, depending upon the accuracy of the position and velocity data desired. The passenger sensor array 4 emits signals which are reflected from various portions of the passenger's head 26, and other portions of the passenger's body, to create a profile of distances from the various portions of the head or other body parts, to passenger sensor array 4. When passenger's head 26 moves forward during a crash, this profile changes, since signals which formerly reflected off the rear of the top of passenger's head 26, now reflect off the seat back; and signals which formerly reflected from the legs now reflect from the passenger's head 26. Comparison of the profiles at various times during a crash event, by microprocessor 8, allows for calculation of expected time of impact with steering wheel 28, or the windshield.

The vehicle accelerometer 6 is a conventional accelerometer, well known in the art, which measures the rate of deceleration of the vehicle, and produces an output signal proportional to the vehicle deceleration, which signal is analyzed by microprocessor 8 as an indication of a crash event. The vehicle accelerometer 6 may be, for example, but is not necessarily, a piezoelectric sensor, which produces an output signal proportional to the vehicle acceleration. See, e.g. U.S. Pat. No. 4,985,835, on the invention of Sterier et al, at Col. 1, lines 35–43. The microprocessor 8, analyzes the outputs of passenger sensor array 4, and vehicle accelerometer 6, to determine whether to deploy the air bag. The output of vehicle accelerometer 6 is analyzed to determine whether the deceleration observed at various times during the time interval 30 from beginning of the crash event, is large enough to indicate a crash, as opposed to unusually strong brake application, or normal road vibrations, potholes, or minor "fender benders". If the deceleration is large enough to indicate a crash, the deceleration is also compared by microprocessor 8 to known crash characteristics for the vehicle, so that the microprocessor 8 determines a parameter indicative of likely crash severity.

Figure 8:
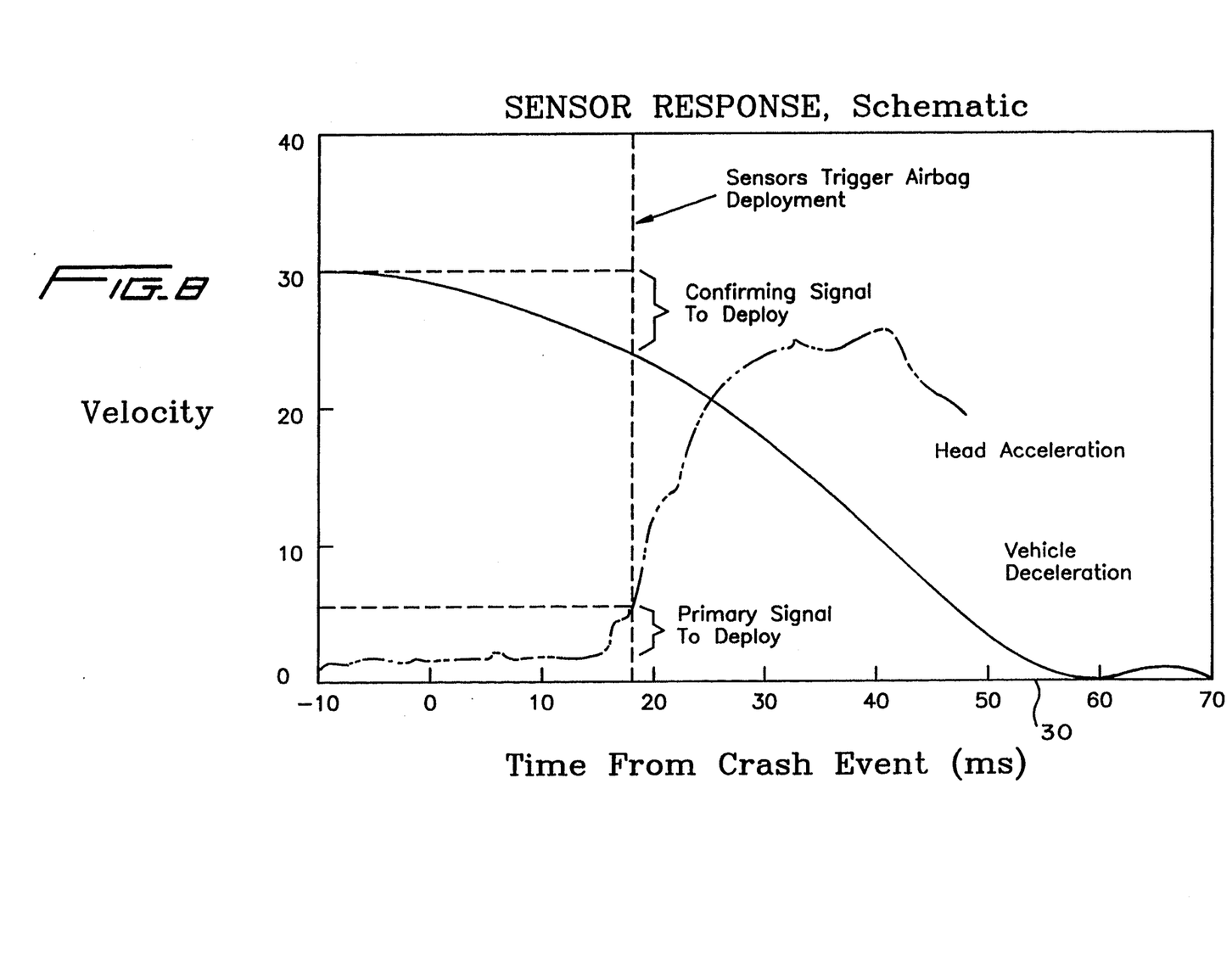
FIG. 8 is a graph showing the general nature of expected sensor responses for vehicle deceleration (solid curve) and acceleration of the head of a passenger (dashed curve), which is intended only to depict the qualitative nature of these curves, and is not based on any actual measurements.

The microprocessor 8 also compares the values of the acceleration of the passenger's head 26, relative to the passenger compartment, and the vehicle deceleration rate, as shown in FIG. 8, and also considers the initial passenger position 24, as to both head height and distance from the impact surface, to determine whether the air bag should be deployed, and, if the decision is to deploy, determines the optimum firing time and sequence for pyrotechnic inflators 22, in order to optimize system performance and minimize the risk of serious injury to the passenger. The vehicle deceleration rate, as sensed by vehicle accelerometer 6, functions as an arming means, such that absent a sufficient vehicle deceleration the air bag 16 will not be deployed, even if the signals from passenger sensor array 4 reveal head motion indicative of a need for deployment. This is to prevent deployment from extraneous violent head motion, e.g. from a violent sneeze.

A more precise description of a suitable deployment paradigm is as follows: The passenger sensor array 4 makes multiple measurements of the "y" dimension between passenger sensor array 4, and passenger's head 26. The signals reflecting these measurements are conveyed by wires (not shown) to microprocessor 8, which conducts a profile of the passenger's head surface, and determines the x-axis location of the profile relative to the potential deployment path of air bag 16. This data is sampled and recorded by microprocessor 8 for a short time (10–15 seconds), and then overwritten with newer data. During a crash, vehicle accelerometer 6 senses the crash pulse and conveys the deceleration vs. time values to microprocessor 8, which compares the values to crash-indicative minimums for the vehicle type. If the acceleration pulse exceeds the minimums, the microprocessor 8 allows ignition of the squibs to initiate deployment of air bag 16, if, within a suitable time window, the "y" dimensions create a profile indicating forward movement of the passenger's head 26 greater than specified minimum velocity values. The minimum might be set for example, at a velocity of 10 mph, or 0.176 inches per millisecond. If the passenger's head 26 moved a "trigger distance" corresponding to this velocity (1.3 inches in less than 7 milliseconds), the microprocessor 8 would interpret this as the second necessary condition to ignite the squib. Based on the actual X axis motion (in the longitudinal direction parallel to the car axis) the microprocessor 8 would calculate the expected arrival time of the passenger's head 26 at the deployment path of the air bag 16, and knowing the inflation response time, trigger the squibs accordingly. Under this paradigm the system would not deploy the air bag 16 unless both the crash deceleration pulse and the head motion exceeded the minima, and would not deploy even then if the profile data indicated that the passenger head position would be into or beyond the path of deployment of air bag 16, before the air bag could deploy. The microprocessor 8 will also activate warning light 12, independently of any crash event, if the data on passenger position indicates that the passenger's head 26 is located too close to the air bag deployment path, so that the head would be in the path of deployment at the maximum operating velocity of the system, estimated to be 35 mph.

The microprocessor 8 will not deploy the air bag, if the analysis indicates that the crash is low-speed, involving low risk of serious injury, or if the analysis indicates that the passenger is too far forward, so that the air bag cannot deploy in time and that attempted deployment not only would not prevent serious injury, but might actually cause additional injury from the deployment itself, as the expanding air bag impacts the passenger's body. For example, if the driver is too far forward, the air bag may come down on the top of the driver's head, or behind the driver, pushing and trapping him against the steering wheel or windshield. Or the driver may be through the windshield before deployment can occur.

The microprocessor 8 also contains a recording means, to record the signals from the passenger sensor array 4 and vehicle accelerometer 6 during the crash event, for later use for crash investigation purposes.

In order to reduce the risk that the passenger will be out of proper position, such as being too far forward to allow deployment of the air bag, the system has multiple means to encourage the passenger to maintain proper position. A warning light 12, on the bottom of mounting tunnel 2, will be activated by microprocessor 8, in response to data from passenger sensor array 4, if the passenger is not in proper position. But in order to have redundancy, and to continuously remind a driver not to assume an improper position, a tactile and printed warning sleeve 32 is affixed to the steering wheel 28, and warns the driver against sitting out of proper position, such as too far forward, and also to warn against having the hands on the top portion of steering wheel 28, i.e. from the 10 O'Clock to 2O'Clock positions, in which the hands might deflect the deploying air bag so that it does not position itself between the driver and steering wheel 28, or in which the deploying air bag might abrade the hands or cause other injuries to the occupant. The warning sleeve 32 might alternatively be replaced by a warning sign located on the hub of the steering wheel 28, or at any other location in which the driver may be warned against improper body or hand position. A suitable warning for the preferred embodiment might read as follows: "Air bag design limitations can be exceeded in frontal crashes over 35 mph, and air bag will not deploy. Lighted warning light indicates limitations. Extend arms and sit well back from wheel to increase effectiveness of the system. Keep hands on sides of wheel to prevent obstruction of air bag deployment. Always wear your seatbelt."

Figures 3, 4, 5:
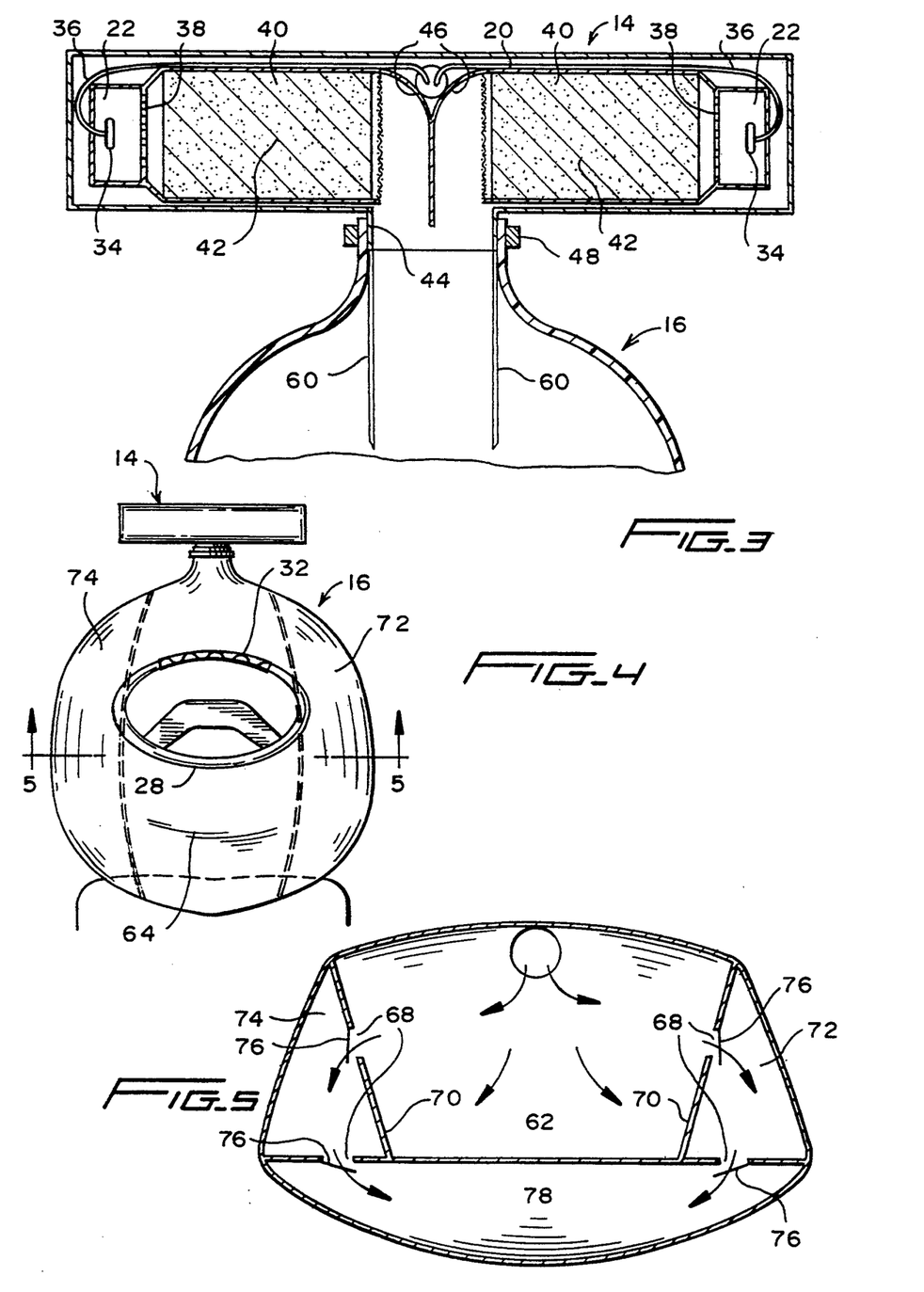
FIG. 3 is cross sectional view of the inflator module and a portion of the inflated air bag, as seen from the rear (driver side).
FIG. 4 is a view of the deployed air bag, as seen from the rear (driver side) of the vehicle.
FIG. 5 is a sectional view of the air bag, for the section 5—5 indicated in FIG. 4.
Figure 6:
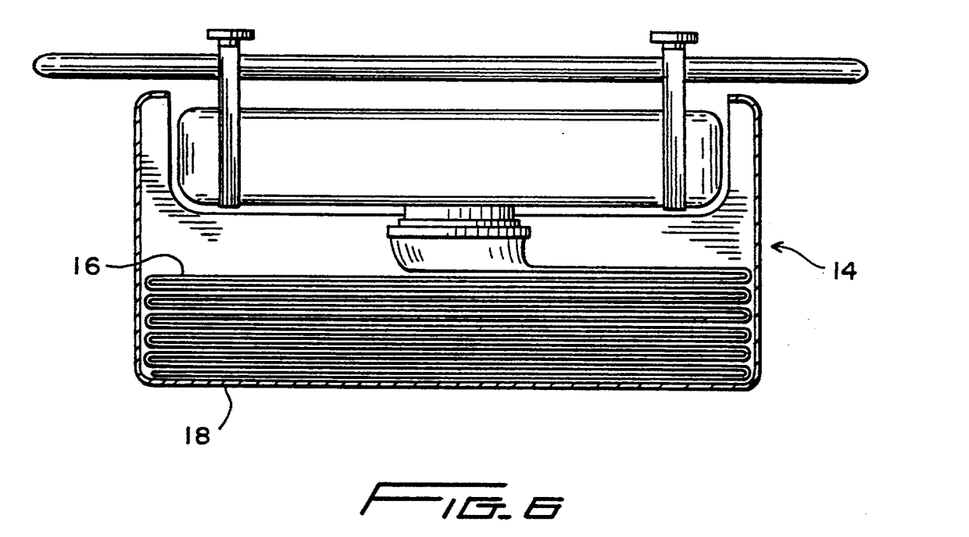
FIG. 6 is a rear sectional view of the air bag module, showing the folded air bag, prior to deployment.
Figure 7:
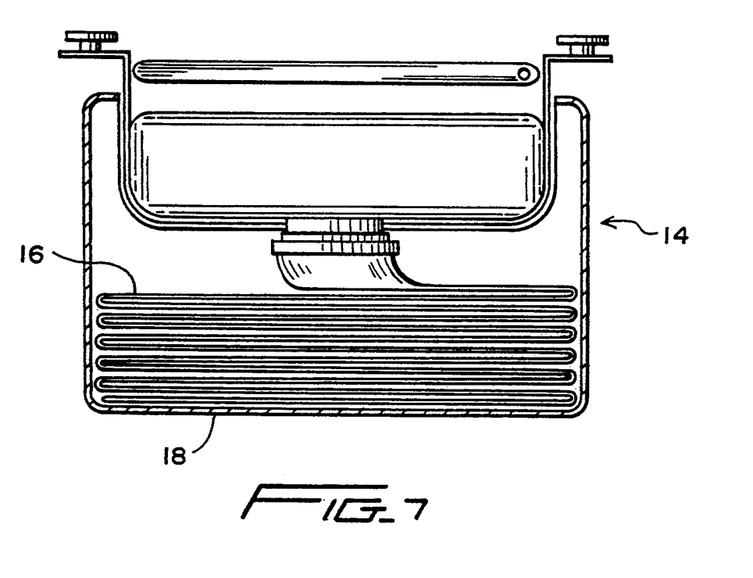
FIG. 7 is a side sectional view of the air bag module in the undeployed configuration as in FIG. 6.

The inflation module 20 is a linear bilateral module, the main portion of which is cylindrical in form, and contains two pyrotechnic inflators 22, one on each side of inflation module 20. Each of pyrotechnic inflators 22 has a pyrotechnic composition containing sodium azide, and which may also contain nitrocellulose. The pyrotechnic composition is one which burns to produce a large volume of gas. Ignition of pyrotechnic inflators 22 is accomplished by means of squibs 34, located in the ends of inflation module 20, which squibs are low temperature pyrotechnic devices to activate burning of pyrotechnic inflators 22. The firing signals, to ignite the squibs 34, are communicated to squibs 34 by wires 36, which connect each of squibs 34 to microprocessor 8. Each of the pyrotechnic inflators 22 communicates through ports 38 with a filter/cooling chamber 40, which conveys the generated gas toward the center of inflation module 20, through screening means 42, in the form of stainless steel mesh materials and screens, which screening means 42 captures and removes hot slag particles, generated in the burning of pyrotechnic inflators 22, from the flowing stream of gas, before it reaches the midportion of inflation module 20. At the midpoint of inflation module 20 is a downwardly-projecting nozzle 44, to convey the gas, as it emerges from the filter/cooling chambers 40, downward into air bag 16. Downwardly-sloping gas diverters 46 join at the midpoint of inflation module 20, to divert the gas downward into nozzle 44.

Figure 9:
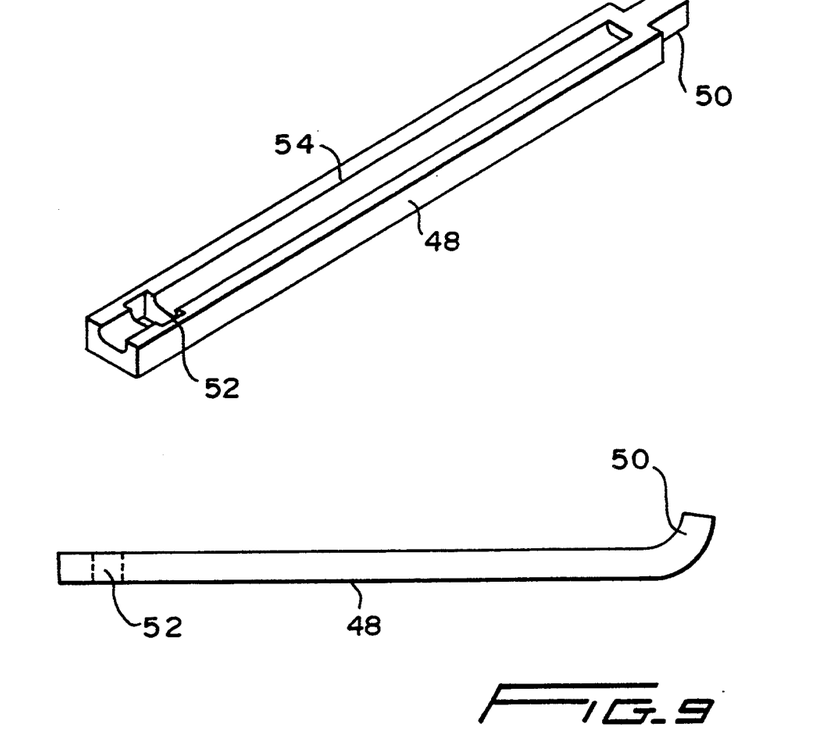
FIG. 9 is a perspective sectional view of the bimetallic air bag release clamp, though the axis of the air bag inflation nozzle, with the lower views in the figure showing a plan and a side elevational view of a strip having a bimetallic tongue.
Figures 10, 11:
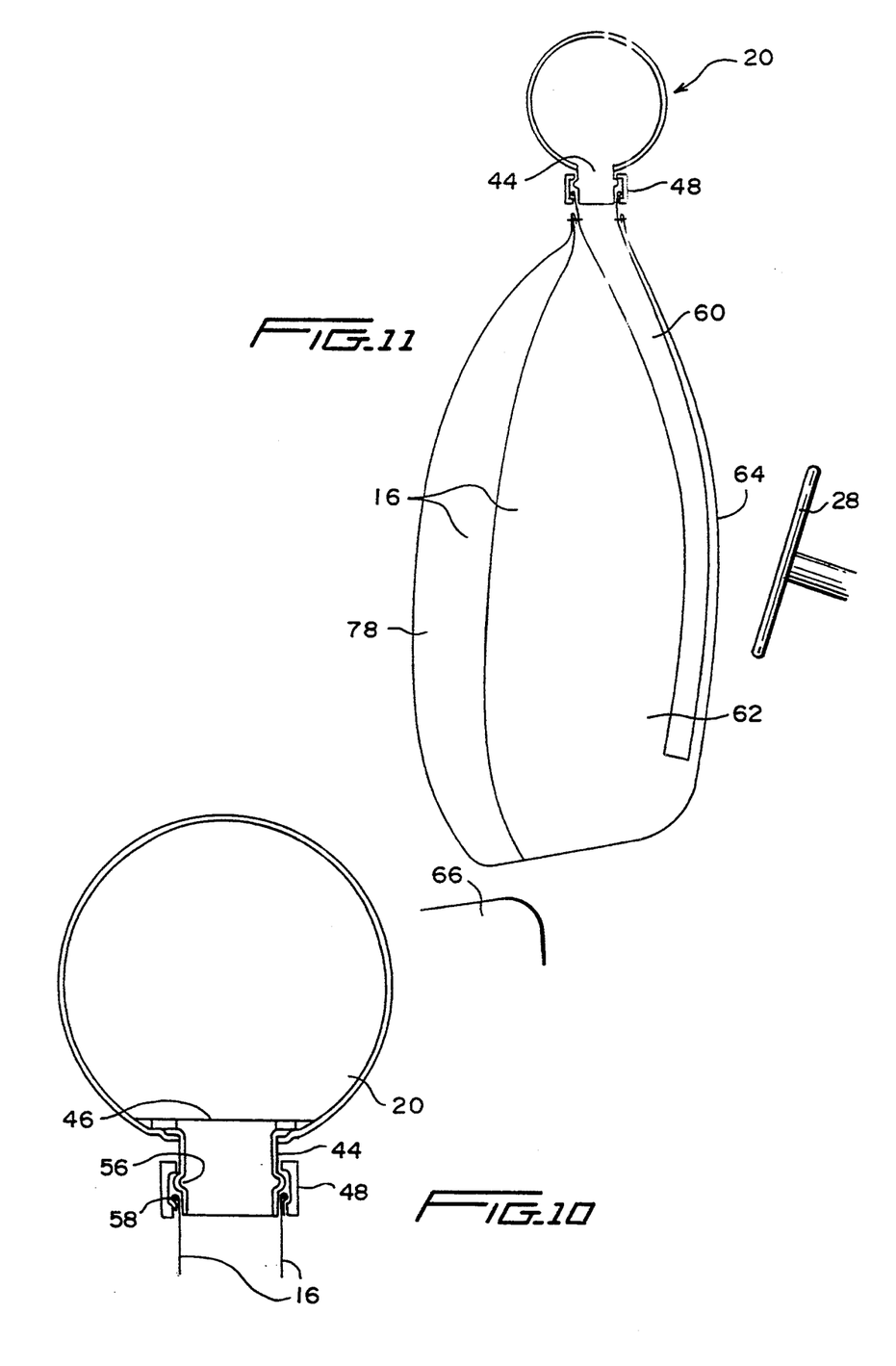
FIG. 10 is a sectional view of the air bag module, on a section normal to and bisecting the longitudinal axis of the module, with the air bag attached by releasable clamp, and the upper portion of the air bag.
FIG. 11 is a side elevational view of the deployed air bag.

The air bag 16 is attached to nozzle 44 by means of a releasable clamp 48. The releasable clamp 48 is a bimetallic clamp, with a curved bimetallic tongue 50 at one end thereof and a matching slot 52 at the other end thereof, for receipt of bimetallic tongue 50. The interior surface of releasable clamp 48 has an annular groove 54, which fits over an outwardly protruding lip 56 in the wall of nozzle 44, and which also holds a fabric filler cord 58, encircling the upper edge of the opening of inflation tube 60, attached to air bag 16, to hold the inflation tube 60 in place attached to nozzle 44, and prevent inflation tube 60 from being blown off of nozzle 44 before the bimetallic portion of releasable clamp 48 relaxes to allow release of releasable clamp 48. The fabric filler cord 58 is a dense, rope-like flexible material which, when stitched into place, gives an unyielding tubular shape to the upper edge of inflation tube 60. The purpose of the releasable clamp 48 is to automatically disengage inflation tube 60 and air bag 16 from nozzle 44 after the crash, to allow deflation of air bag 16 and free the passenger from the restraint and blockage of view caused by air bag 16. This is accomplished automatically by the effect of heat from burning of the pyrotechnic inflators 22, carried by the gas exiting inflation module 20 through nozzle 44, which heats the releasable clamp 48, so as to expand bimetallic tongue 50, and thereby free inflation tube 60 and air bag 16 from releasable clamp 48, at which point residual gas pressure in inflation tube 60 and air bag 16 forces inflation tube 60 off of nozzle 44, so that the air bag 16 may fully deflate and free the driver from restraint and blockage of view. The nozzle 44 is made of a metal or other good heat conductor, in this embodiment.

The air bag module 14 and the mounting tunnel 2 are securely attached to the interior roof of the passenger compartment in any convenient manner, by means well known in the art. For example, straps may be used to secure these components to adhesive mounted pods adhesively secured to the roof (not shown), or these components may be secured to the roof frame by means of screws or bolts, or other secure fastening means. It is desirable to provide insulation between the inflation module 20 and the roof, to protect sensitive components of the system from heat conveyed inward through the roof, such as could occur when driving in summer desert conditions.

The air bag 16 is a four-chamber air bag, so constructed as to provide for sequential flow of the gas between chambers of the air bag, which applicant believes may extend the total cushioning time provided by the air bag during a collision. The gas first enters air bag 16 through an inflation tube 60, which is attached to nozzle 44. The inflation tube 60 is tubular and is open at bottom to allow the gas to escape into the first air bag chamber 62. Inflation tube 60 is stitched to the center front panel 64 of air bag 16. After exiting from the bottom of inflation tube 60, the gas fills the first air bag chamber 62, which extends vertically through most of the space between nozzle 44, and seat cushion 66, and extends laterally about 2" beyond each edge of the steering wheel 28, and has a depth of about 9". Gas flows almost immediately from first air bag chamber 62, through vent holes 68 in side panels 70, into a second air bag chamber 72, and a third air bag chamber 74. Each of vent holes 68 has a back-flow prevention means 76, to retard flow of gas back into first air bag chamber 62. The back-flow prevention means 76 could be a cover fabric over each of the vent holes 68, or could be a one way valve of any suitable type. Gas flows from second air bag chamber 72, and from third air bag chamber 74, into fourth air bag chamber 78, through more of vent holes 68, of the same form. The fourth air bag chamber 78 is of full width and height, extending laterally about 4" on either side of steering wheel 28, and vertically from nozzle 44 to about 3" above seat cushion 66, and having a depth of about 14".

Those familiar with the art will appreciate that the invention may be employed in configurations other than the specific forms disclosed in the preferred embodiment, without departing from the essential substance thereof.

For example, and not by way of limitation, although pyrotechnic inflators 22 are used to generate the gas which inflated the air bag 16, and to generate the heat which releases the releasable clamp 48, the inflation means could instead be provided by compressed gas, stored in a cylinder, released by an electrically operated valve responsive to a signal from the microprocessor 8, and the air bag release means could instead be provided by an electromechanically operated clamp release, or by electrically operated explosive bolts or fasteners, responsive to an electrical signal from the microprocessor 8. Although the air bag module 14 is overhead-mounted in the preferred embodiment, it could instead be mounted on upper end of the steering column, in a system still employing overhead passenger motion sensor apparatus, to avoid the problem of driver hand occlusion of passenger motion sensors.

The scope of the invention is defined by the following claims, including also all subject matter encompassed by the doctrine of equivalents as applicable to the claims.

I claim:

1. Air bag deployment system, for inflation and deployment of an air bag in front of a passenger in a motor vehicle during a collision, said motor vehicle having a passenger compartment for passengers in said motor vehicle, and having a steering wheel for use by a passenger who acts as a driver of said motor vehicle, said passenger compartment also having an interior roof, and a dashboard forward of said steering wheel, and having a seat for said passenger, said air bag deployment system comprising:

(a) an air bag;
(b) yieldable housing means, for housing said air bag in a folded configuration when said air bag is not deployed, and for yielding and allowing release of said air bag from said housing means into said passenger compartment for deployment of said air bag in front of said passenger, when said air bag is inflated;
(c) inflation means, connected to said air bag, for inflating said air bag with a gas;
(d) passenger sensor means, for sensing position and velocity of said passenger, with respect to said passenger compartment, and for generating electrical signals indicative of said position and velocity of said passenger;
(e) vehicle deceleration sensor means, for sensing deceleration of said vehicle, and for generating an electrical signal indicative of said acceleration of said vehicle;
(f) microprocessor means, electrically connected to said passenger sensor means, to said vehicle deceleration sensor means, and to said inflation means, for comparing and performing an analysis of said electrical signals from said passenger sensor means and said vehicle deceleration sensor means, and for activating said inflation means to inflate and deploy said air bag, when said analysis indicates that said vehicle is involved in a collision and that deployment of said air bag would likely reduce a risk of serious injury to said passenger which would exist absent deployment of said air bag; and
(g) automatic release means, connected to said air bag and to said inflation means, to automatically release said air bag from said inflation means, and allow deflation of said air bag and freeing of said passenger from said air bag when said collision is over.

2. Air bag deployment system as in claim 1, wherein said inflation means is an apparatus which generates heated gas by combustion of a pyrotechnic material, and wherein said automatic release means is a heat-responsive means, responsive to said heated gas.

3. Air bag deployment system as in claim 2, wherein said heat-responsive means is a bimetallic clamp connecting said air bag to a nozzle conveying heated gas from said inflation means to said air bag.

4. Air bag deployment system as in claim 1, wherein said air bag is a multichamber air bag, having a first chamber which is the chamber first entered by said gas generated by said inflation means, and having means to allow sequential flow of said gas from said first chamber to a plurality of successive chambers, and having means to retard back flow of said gas in the direction opposite to the direction of flow from said first chamber to said successive chambers.

5. Air bag deployment system as in claim 4, wherein said passenger sensor means is mounted on said interior roof of said passenger compartment.

6. Air bag deployment system as in claim 4, wherein said microprocessor further comprises means for recording said electrical signals from said passenger sensor means and said vehicle deceleration sensor means, during said collision.

7. Air bag deployment system as in claim 1, wherein said passenger sensor means is mounted on said interior roof of said passenger compartment.

8. Air bag deployment system as in claim 1, wherein said microprocessor further comprises means for recording said electrical signals from said passenger sensor means and said vehicle deceleration sensor means, during said collision.

9. Air bag deployment system as in claim 1, wherein said passenger sensor means is mounted on said interior roof of said passenger compartment, and wherein said microprocessor further comprises means for recording said electrical signals from said passenger sensor means and said vehicle deceleration sensor means, during said collision.

10. Air bag deployment system, for inflation and deployment of an air bag in front of a passenger in a motor vehicle during a collision, said motor vehicle having a passenger compartment for passengers in said motor vehicle, and having a steering wheel for use by a passenger who acts as a driver of said motor vehicle, said passenger compartment also having an interior roof, and a dashboard forward of said steering wheel, and having a seat for said passenger, said air bag deployment system comprising:

(a) an air bag;
(b) yieldable housing means, for housing said air bag in a folded configuration when said air bag is not deployed, and for yielding and allowing release of said air bag from said housing means into said passenger compartment for deployment of said air bag in front of said passenger, when said air bag is inflated;
(c) inflation means, connected to said air bag, for inflating said air bag with a gas;
(d) passenger sensor means, for sensing position and velocity of said passenger, with respect to said passenger compartment, and for generating electrical signals indicative of said position and velocity of said passenger;
(e) vehicle deceleration sensor means, for sensing deceleration of said vehicle, and for generating an electrical signal indicative of said acceleration of said vehicle;
(f) microprocessor means, electrically connected to said passenger sensor means, to said vehicle deceleration sensor means, and to said inflation means, for comparing and performing an analysis of said electrical signals from said passenger sensor means and said vehicle deceleration sensor means, and for activating said inflation means to inflate and deploy said air bag, when said analysis indicates that said vehicle is involved in a collision and that deployment of said air bag would likely reduce a risk of serious injury to said passenger which would exist absent deployment of said air bag, and for activating a first position warning means, when said passenger is in a position such that said Air bag deployment system cannot properly operate to reduce risk of serious injury to said passenger in said collision, to warn said passenger to cease being in said position;
(g) a first position warning means, electrically connected to said microprocessor means, for producing a warning noticeable to said passenger, when said passenger is in a position such that said Air bag deployment system cannot properly operate to reduce risk of serious injury to said passenger in said collision; and
(h) a second position warning means, to continuously warn said driver against having any portion of said driver's body in a position such that said air bag deployment system cannot properly operate to reduce risk of serious injury to said driver in said collision.

11. Air bag deployment system as in claim 10, wherein said second position warning means is a visible and tactile sign attached to said steering wheel.

12. Air bag deployment system, for inflation and deployment of an air bag in front of a passenger in a motor vehicle during a collision, said motor vehicle having a passenger compartment for passengers in said motor vehicle, and having a steering wheel for use by passenger who acts as a driver of said motor vehicle, said passenger compartment also having an interior roof, and a dashboard forward of said steering wheel, and having a seat for said passenger, said air bag deployment system comprising:

(a) an air bag;
(b) yieldable housing means, for housing said air bag in a folded configuration when said air bag is not deployed, and for yielding and allowing release of said air bag from said housing means into said passenger compartment for deployment of said air bag in front of said passenger, when said air bag is inflated;
(c) inflation means, connected to said air bag, for inflating said air bag with a gas;
(d) passenger sensor means, for sensing position and velocity of said passenger, with respect to said passenger compartment, and for generating electrical signals indicative of said position and velocity of said passenger;
(e) vehicle deceleration sensor means, for sensing deceleration of said vehicle, and for generating an electrical signal indicative of said acceleration of said vehicle;
(f) microprocessor means, electrically connected to said passenger sensor means, to said vehicle deceleration sensor means, and to said inflation means, for comparing and performing an analysis of said electrical signals from said passenger sensor means and said vehicle deceleration sensor means, and for activating said inflation means to inflate and deploy said air bag, when said analysis indicates that said vehicle is involved in a collision and that deployment of said air bag would likely reduce a risk of serious injury to said passenger which would exist absent deployment of said air bag, and for activating a first position warning means, when said passenger is in a position such that said Air bag deployment system cannot properly operate to reduce risk of serious injury to said passenger in said collision, to warn said passenger to cease being in said position;

(g) a first position warning means, electrically connected to said microprocessor means, for producing a warning noticeable to said passenger, when said passenger is in a position such that said Air bag deployment system cannot properly operate to reduce risk of serious injury to said passenger in said collision;

(h) a second position warning means, to continuously warn said driver against having any portion of said driver's body in a position such that said Air bag deployment system cannot properly operate to reduce risk of serious injury to said driver in said collision; and (i) automatic release means, connected to said air bag and to said inflation means, to automatically release said air bag from said inflation means, and allow deflation of said air bag and freeing of said passenger from said air bag when said collision is over.

13. Air bag deployment system, for inflation and deployment of an air bag in front of a passenger in a motor vehicle during a collision, said motor vehicle having a passenger compartment for passengers in said motor vehicle, and having a steering wheel for use by a passenger who acts as a driver of said motor vehicle, said passenger compartment also having an interior roof, and a dashboard forward of said steering wheel, and having a seat for said passenger, said air bag deployment system comprising:

(a) an air bag;

(b) yieldable housing means, for housing said air bag in a folded configuration when said air bag is not deployed, and for yielding and allowing release of said air bag from said housing means into said passenger compartment for deployment of said air bag in front of said passenger, when said air bag is inflated;

(c) inflation means, connected to said air bag, for inflating said air bag with a gas, said inflation means comprising a linear bilateral inflation module, containing a pyrotechnic inflator composition in each end thereof, and a squib connected to each pyrotechnic inflator, each of said squibs being electrically connected to a microprocessor means for firing of said squib, and each of said pyrotechnic inflators communicating through ports with a filter/cooling chamber containing filter means to filter out hot slag particles from combustion of said pyrotechnic inflator composition, and each of said filter/cooling chambers leading to the center of said inflation module, and having at the center of said inflation module a nozzle means to convey gas to said air bag, and having diverter means at the center of said inflation module to divert gas exiting each said filter/cooling chamber, into said nozzle means;

(d) passenger sensor means, for sensing position and velocity of said passenger, with respect to said passenger compartment, and for generating electrical signals indicative of said position and velocity of said passenger;

(e) vehicle deceleration sensor means, for sensing deceleration of said vehicle, and for generating an electrical signal indicative of said acceleration of said vehicle;

(f) microprocessor means, electrically connected to said passenger sensor means, to said vehicle deceleration sensor means, and to said inflation means, for comparing and performing an analysis of said electrical signals from said passenger sensor means and said vehicle deceleration sensor means, and for activating said inflation means to inflate and deploy said air bag, when said analysis indicates that said vehicle is involved in a collision and that deployment of said air bag would likely reduce a risk of serious injury to said passenger which would exist absent deployment of said air bag; and (g) automatic release means, connected to said air bag and to said inflation means, to automatically release said air bag from said inflation means, and allow deflation of said air bag and freeing of said passenger from said air bag when said collision is over.

* * * * *